US011569039B2

(12) United States Patent
Lee et al.

(10) Patent No.: US 11,569,039 B2
(45) Date of Patent: Jan. 31, 2023

(54) CONDUCTIVE POWDER PARTICLE FOR INTERNAL ELECTRODE AND ELECTRONIC COMPONENT, AND MANUFACTURING METHOD THEREOF

(71) Applicant: SAMSUNG ELECTRO-MECHANICS CO., LTD., Suwon-si (KR)

(72) Inventors: Sang Moon Lee, Suwon-si (KR); Jae Young Na, Suwon-si (KR); Eun Kwang Lee, Suwon-si (KR); Won Hee Yoo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 29 days.

(21) Appl. No.: 17/375,327

(22) Filed: Jul. 14, 2021

(65) Prior Publication Data

US 2022/0157531 A1 May 19, 2022

(30) Foreign Application Priority Data

Nov. 16, 2020 (KR) .......................... 10-2020-0152613

(51) Int. Cl.
*H01G 4/30* (2006.01)
*H01G 4/12* (2006.01)
(Continued)

(52) U.S. Cl.
CPC ............... *H01G 4/30* (2013.01); *C04B 35/01* (2013.01); *H01G 2/065* (2013.01); *H01G 4/008* (2013.01);
(Continued)

(58) Field of Classification Search
CPC .. C04B 35/01; C04B 2235/652; H01G 4/008; H01G 4/012; H01G 4/1209
See application file for complete search history.

(56) References Cited

U.S. PATENT DOCUMENTS

| 2012/0258367 A1 | 10/2012 | Jung et al. |
| 2014/0139973 A1 | 5/2014 | Oh et al. |
| (Continued) | | |

FOREIGN PATENT DOCUMENTS

| KR | 10-2012-0113995 A | 10/2012 |
| KR | 10-1515991 B1 | 4/2015 |
| (Continued) | | |

OTHER PUBLICATIONS

M. Caragiu, et al., "Alkali metal adsorption on graphite: a review," Institute of Physics Publishing, Journal of Physics; Condensed Matter., vol. 17, 2005, pp. 995-1024.

*Primary Examiner* — Nathan Milakovich
(74) *Attorney, Agent, or Firm* — Morgan, Lewis & Bockius LLP

(57) ABSTRACT

An electronic component includes a body including a plurality of stacked dielectric layers and internal electrodes disposed with a corresponding dielectric layer interposed therebetween, and external electrodes disposed on the body and connected to corresponding internal electrodes. One of the internal electrodes includes a particle including Ni and Sn and a graphene layer disposed at a boundary of the particle. A ratio of an Sn content to a total content of Ni and Sn is Sn/(Ni+Sn), Sn/(Ni+Sn) of a first region located inside the particle at a first distance from a boundary between the particle and the graphene layer is A1, Sn/(Ni+Sn) of a second region located inside the particle at a second distance from a boundary between the particle and the graphene layer is A2, the second distance is smaller than the first distance, and A1 is smaller than A2.

20 Claims, 12 Drawing Sheets

(51) Int. Cl.
    *H01G 4/012*     (2006.01)
    *H01G 2/06*     (2006.01)
    *C04B 35/01*     (2006.01)
    *H01G 4/008*     (2006.01)

(52) U.S. Cl.
    CPC .......... *H01G 4/012* (2013.01); *H01G 4/1209* (2013.01); *C04B 2235/652* (2013.01)

(56) References Cited

U.S. PATENT DOCUMENTS

| | | | |
|---|---|---|---|
| 2015/0155098 A1* | 6/2015 | Yamaguchi | H01G 13/00 156/89.16 |
| 2016/0155571 A1* | 6/2016 | Doi | H01G 4/12 156/89.16 |
| 2019/0103224 A1 | 4/2019 | Han et al. | |
| 2020/0090865 A1 | 3/2020 | Kim et al. | |
| 2021/0020363 A1 | 1/2021 | Song et al. | |
| 2022/0157526 A1* | 5/2022 | Yoo | H01G 4/012 |

FOREIGN PATENT DOCUMENTS

| | | |
|---|---|---|
| KR | 10-2019-0038237 A | 4/2019 |
| KR | 10-1973451 B1 | 4/2019 |
| KR | 10-2019-0116133 A | 10/2019 |
| KR | 10-2019-0121181 A | 10/2019 |

\* cited by examiner

CONDUCTIVE POWDER PARTICLE FOR INTERNAL ELECTRODE AND ELECTRONIC COMPONENT, AND MANUFACTURING METHOD THEREOF

CROSS-REFERENCE TO RELATED APPLICATION(S)

This application claims benefit of priority to Korean Patent Application No. 10-2020-0152613 filed on Nov. 16, 2020 in the Korean Intellectual Property Office, the disclosure of which is incorporated herein by reference in its entirety.

TECHNICAL FIELD

The present disclosure relates to a conductive powder particle, an electronic component, and a manufacturing method thereof.

BACKGROUND

Multilayer capacitors such as a multilayer ceramic capacitor (MLCC) include a plurality of dielectric layers and a plurality of internal electrodes alternately disposed with the dielectric layers interposed therebetween. Sn may be used as an additive to improve characteristics of such internal electrodes. Sn added to internal electrodes may improve reliability (e.g., high temperature load life). However, as Sn diffuses from the internal electrode to the dielectric layer, a capacitance reduction phenomenon may occur.

SUMMARY

Exemplary embodiments provide an electronic component with improved reliability.

Exemplary embodiments provide a conductive powder particle used to manufacture internal electrodes of the electronic component.

Exemplary embodiments provide a method for manufacturing an electronic component with improved reliability using the conductive powder particle.

The technical problems of the present disclosure are not limited to the technical problems mentioned above, and other technical problems that are not mentioned herein will be clearly understood by those skilled in the art from the following description.

According to an aspect of the present disclosure, an electronic component includes: a body including a plurality of stacked dielectric layers and a plurality of internal electrodes disposed with a corresponding dielectric layer interposed therebetween; and external electrodes disposed on the body and connected to internal electrodes corresponding thereto. One of the internal electrodes includes a particle including Ni and Sn and a graphene layer disposed at a boundary of the particle. A ratio of an Sn content to a total content of Ni and Sn is Sn/(Ni+Sn), Sn/(Ni+Sn) of a first region located inside the particle at a first distance from a boundary between the particle and the graphene layer is A1, Sn/(Ni+Sn) of a second region located inside the particle at a second distance from a boundary between the particle and the graphene layer is A2, the second distance is smaller than the first distance, and A1 is smaller than A2.

According to an aspect of the present disclosure, an electronic component includes: a body including a plurality of stacked dielectric layers and internal electrodes disposed with a corresponding dielectric layer interposed therebetween; and external electrodes disposed on the body and connected to the plurality of internal electrodes. A ratio of an Sn content to a total content of Ni and Sn is Sn/(Ni+Sn), Sn/(Ni+Sn) at a point of $5/10$ of a thickness of one of the internal electrodes is A3, Sn/(Ni+Sn) at a point of $9/10$ or $1/10$ of the thickness of the one of the internal electrodes is A4, ABS is a function of calculating an absolute value, and $0 \leq ABS(A4-A3)/A4 \leq 10\%$ is satisfied.

According to an aspect of the present disclosure, a conductive powder particle for internal electrodes includes: a metal powder particle; a coating layer formed to surround at least a portion of a surface of the metal powder particle and including Sn; and graphene formed to surround at least a portion of a surface of the coating layer.

According to an aspect of the present disclosure, a method for manufacturing an electronic component includes: forming an unsintered body including a plurality of unsintered dielectric layers and unsintered internal electrodes formed by applying a conductive paste including Ni, Sn, and graphene to the unsintered dielectric layers; and sintering the unsintered body to form a sintered body, wherein the conductive paste includes conductive powder particles including a metal powder particle including Ni, a coating layer formed to surround at least a portion of a surface of the metal powder particle and including Sn, and graphene formed to surround at least a portion of a surface of the coating layer.

Specific details of other exemplary embodiments are included in the detailed description and drawings.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
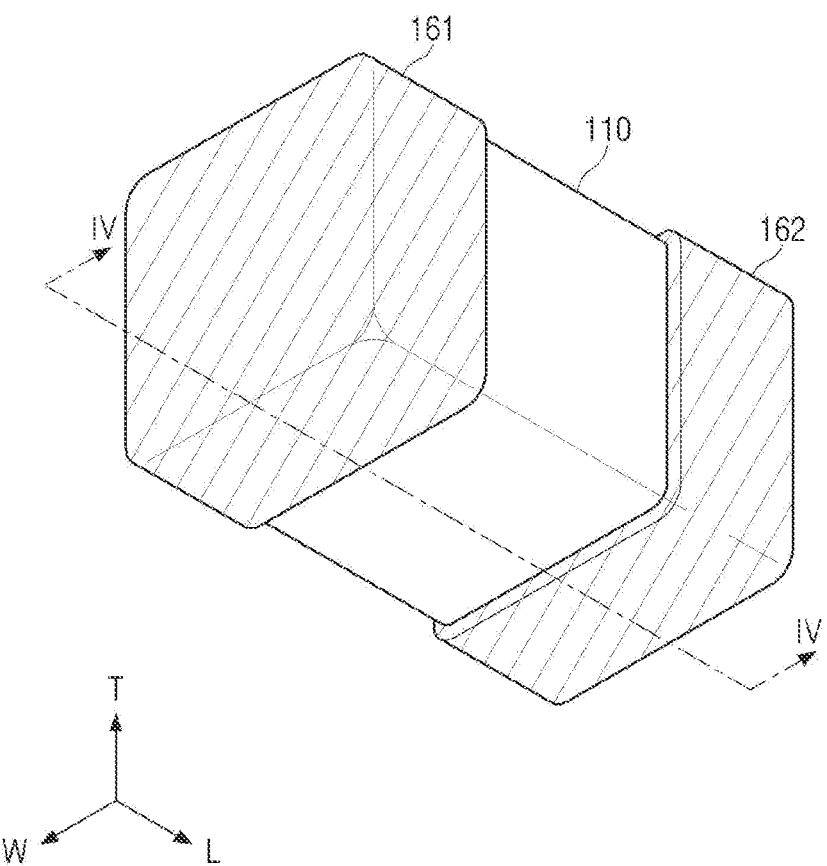
FIG. 1 is a perspective view illustrating an electronic component according to an exemplary embodiment in the present disclosure.

Advantages and features of the invention and methods to achieve the same are described more fully hereinafter with reference to the accompanying drawings in which embodiments are shown. This invention may, however, be embodied in many different forms and should not be construed as limited to the embodiments set forth herein. Rather, these embodiments are provided so that this disclosure is thorough, and will fully convey the scope of the invention to those skilled in the art and this invention is defined by the scope of the claims. Like reference numerals refer to like elements throughout the present specification.

It will be understood that when an element or a layer is referred to as being "on" or "above" another element or layer, it can be directly on or above the other element or layer or intervening elements or layers may be present. In contrast, when an element is referred to as being "directly on" or "directly above", there are no intervening elements or layers.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented and the spatially relative descriptors used herein interpreted accordingly.

It will be understood that, although the terms "first", "second", etc. may be used herein to describe various elements, constituent elements and/or sections, the elements, constituent elements and/or sections should not be limited by these terms. These terms are only used to distinguish one element, constituent element, or section from another element, constituent element, or section. Thus, a first element, a first constituent element, or a first section discussed below should be termed a second element, a second constituent element, or a second section.

Hereinafter, various exemplary embodiments in the present disclosure will be described with reference to the accompanying drawings.

Figure 2:
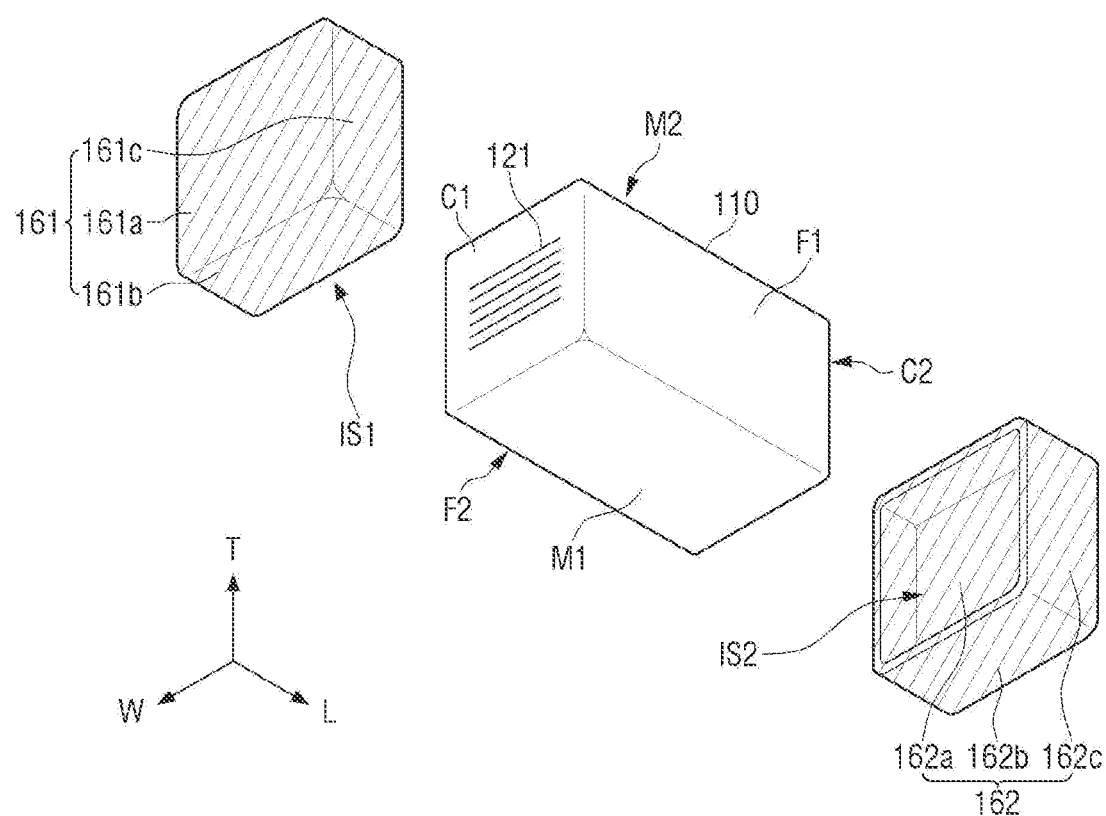
FIG. 2 is an exploded perspective view illustrating the electronic component of FIG. 1.
Figure 3:
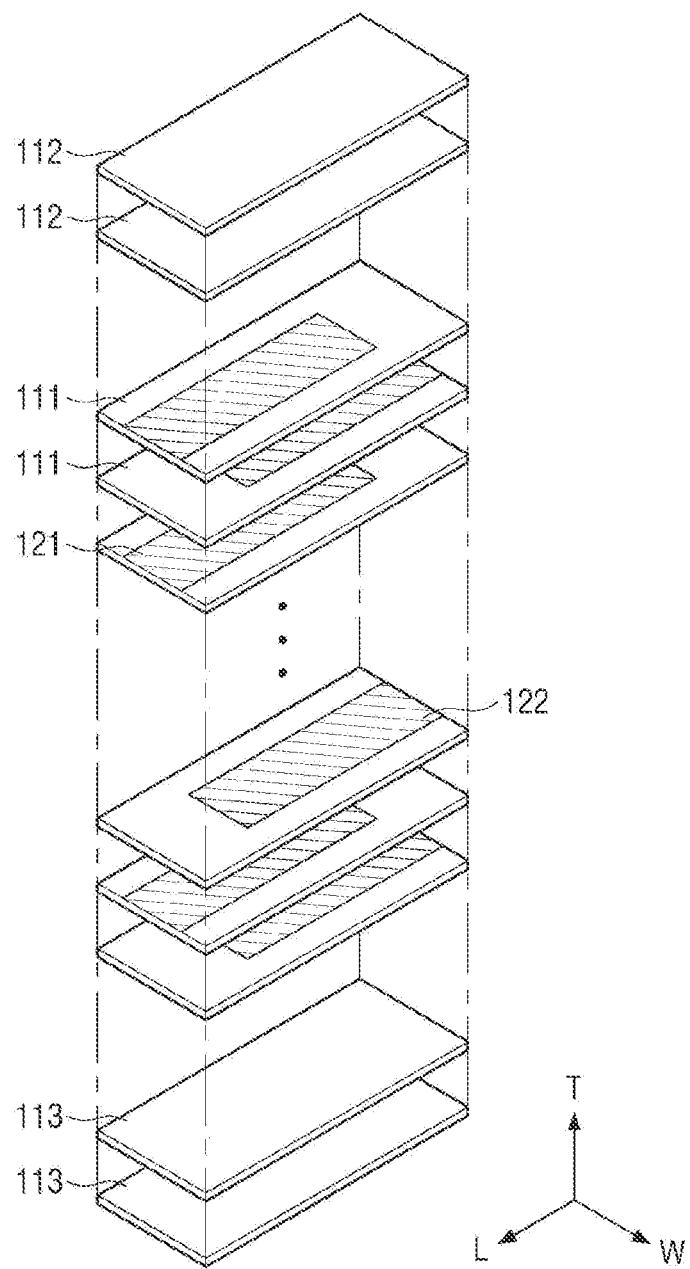
FIG. 3 is an exploded perspective view illustrating a body of the electronic component shown in FIG. 1.
Figure 4:
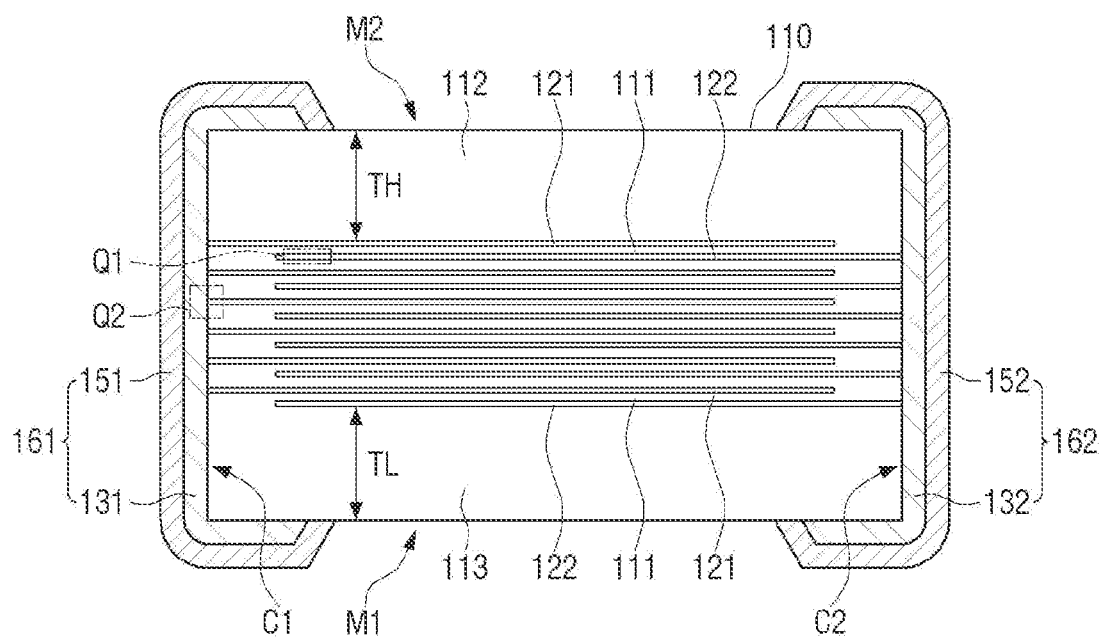
FIG. 4 is a cross-sectional view taken along line IV-IV of FIG. 1.

FIG. 1 is a perspective view illustrating an electronic component according to an exemplary embodiment in the present disclosure. FIG. 2 is an exploded perspective view illustrating the electronic component of FIG. 1. FIG. 3 is an exploded perspective view illustrating a body of the electronic component shown in FIG. 1. FIG. 4 is a cross-sectional view taken along line IV-IV of FIG. 1.

First, referring to FIGS. 1, 2 and 4, an electronic component 100 according to an exemplary embodiment in the present disclosure includes a body (or a ceramic body) 110, a first external electrode 161, and a second external electrode 162.

The body 110 may have, for example, a hexahedral shape. Specifically, the body 110 may include six surfaces M1, M2, F1, F2, C1, and C2, as shown in FIG. 2. A first surface M1 and a second surface M2 face each other in a third direction T (or in a thickness direction of the body 110). When the electronic component 100 is mounted on a substrate (or a board), the first surface M1 or the second surface M2 may be a surface (i.e., a mounting surface) mounted on the substrate. A third surface F1 and a fourth surface F2 face each other in a second direction W (or in a width direction of the body 110). The third surface F1 and the fourth surface F2 are connected to the first surface M1 and the second surface M2. A fifth surface C1 and a sixth surface C2 face each other in a first direction L (or in a length direction of the body 110). The fifth surface C1 and the sixth surface C2 are connected to the first surface M1, the second surface M2, the third surface F1, and the fourth surface F2.

As shown in FIG. 3, the body 110 includes a plurality of dielectric layers 111, a plurality of first internal electrodes 121, and a plurality of second internal electrodes 122. Specifically, the plurality of dielectric layers 111 are stacked, and the plurality of first internal electrodes 121 and the plurality of second internal electrodes 122 are alternately disposed with the dielectric layer 111 interposed therebetween.

The plurality of dielectric layers 111 are in a sintered state, and adjacent dielectric layers 111 may be integrated such that boundaries therebetween may not be readily apparent.

Here, the dielectric layer 111 may include a ceramic material having a high dielectric constant, and may include, for example, barium titanate ($BaTiO_3$)-based or strontium titanate ($SrTiO_3$)-based powder particles, but is not limited thereto. In other words, any material that may obtain sufficient capacitance may be used. In addition, a ceramic additive, an organic solvent, an organic binder, a plasticizer, a binder, a dispersant, and the like may be optionally further added to the dielectric layer 111 in addition to the ceramic powder particle. Ceramic additives may include transition metal oxides or carbides, rare earth elements, magnesium (Mg) or aluminum (Al), but examples of the ceramic additives are not limited thereto.

The plurality of first internal electrodes 121 and the plurality of second internal electrodes 122 overlap in the third direction T (or in the thickness direction of the body 110), and overlapping areas relate to the formation of capacitance of a capacitor.

The first internal electrode 121 and the second internal electrode 122 have nickel (Ni) as a main component and may include the following additives.

As an additive, at least one material selected from the group consisting of Li, Na, and K may be used to increase conductivity of the internal electrodes 121 and 122 by reducing the formation of nickel oxide (NiO). In addition, in order to improve reliability of the internal electrodes 121 and 122, at least one material selected from the group consisting of Sn, Cu, Ag, Pb, Pt, Rh, Ir, Ru, Os, In, Ga, Zn, Bi, and Pb may be used. In addition, at least one material selected from the group consisting of Ba, Mg, Dy, and Ti may be used to make an interfacial composition of the internal electrodes 121 and 122 uniform.

In addition, the internal electrodes 121 and 122 may further include graphene. Graphene helps to secure a target capacitance by improving connectivity of the internal electrodes 121 and 122, and may improve conductivity of the internal electrodes 121 and 122.

As shown in FIG. 4, the plurality of first internal electrodes 121 are exposed to (or being in contact with or extend from) the fifth surface C1 and electrically connected to the first external electrode 161. The plurality of second internal electrodes 122 are exposed to (or being in contact with or extend from) the sixth surface C2 and electrically connected to the second external electrode 162. When a voltage is applied to the first and second external electrodes 161 and 162, charges are accumulated between the first and second internal electrodes 121 and 122 facing each other.

The body 110 may further include a lower cover layer 113 located below the lowermost inner electrode among the plurality of first inner electrodes 121 and the plurality of second inner electrodes 122. In addition, the body 110 may further include an upper cover layer 112 located above the uppermost inner electrode among the plurality of first internal electrodes 121 and the plurality of second internal electrodes 122. The lower cover layer 113 and the upper cover layer 112 are sintered together with a plurality of dielectric layers 111 and may be integrated so that boundaries therebetween may not be readily apparent.

The lower cover layer 113 and the upper cover layer 112 may be formed by stacking a single dielectric layer or two or more dielectric layers in the third direction T (e.g., in the thickness direction of the body 110). The lower cover layer 113 and the upper cover layer 112 serve to prevent damage to the first internal electrode 121 and the second internal electrode 122 from physical/chemical stress. In addition, in order to remove mounting directionality, a thickness TL of the lower cover layer 113 and a thickness TH of the upper cover layer 112 may be equal, but are not limited thereto. The lower cover layer 113 or the upper cover layer 112 may have the same material and configuration as the dielectric layer 111, but is not limited thereto.

A shape and dimensions of the body 110, the number of stacks of the dielectric layer 111, the number of stacks of the first internal electrode 121 and the second internal electrode 122, and the thicknesses TL and TH of the lower and upper cover layers 113 and 112 may vary according to design, and are not limited to those shown.

Referring back to FIGS. 1, 2, and 4, the first external electrode 161 includes a first connection portion 161a, a first mounting portion 161b, and a first side portion 161c. The first connection portion 161a is disposed on the fifth surface C1 of the body 110 and is connected to the plurality of first internal electrodes 121 exposed to the fifth surface C1. The first mounting portion 161b extends from the first connection portion 161a to the first surface M1 and the second surface M2 of the body 110. The first side portion 161c extends from the first connection portion 161a to the third surface F1 and the fourth surface F2 of the body 110. In other words, the first mounting portion 161b may be parallel to a plane formed by the first internal electrode 121, and the first side portion 161c may be perpendicular to the plane formed by the first internal electrode 121.

The first mounting portion 161b disposed on the first surface M1 of the body 110 and the first mounting portion 161b disposed on the second surface M2 of the body 110 may be symmetrical to each other based on the body 110 in the third direction T. For example, a length of the first mounting portion 161b disposed on the first surface M1 of the body 110 in the first direction L (or the second direction W) and a length of the first mounting portion 161b disposed on the second surface M2 of the body 110 in the first direction L (or the second direction W) are equal.

Similarly, the first side portion 161c disposed on the third side F1 of the body 110 and the first side portion 161c disposed on the fourth side F2 of the body 110 are symmetrical to each other in the second direction W based on the body 110. That is, a length of the first side portion 161c disposed on the third surface F1 of the body 110 in the first direction L (or the third direction T) and a length of the first side portion 161c disposed on the fourth surface F2 of the body 110 in the first direction or the third direction T) are equal.

Similarly, the second external electrode 162 includes a second connection portion 162a, a second mounting portion 162b, and a second side portion 162c. The second connection portion 162a is disposed on the sixth surface C2 of the body 110 and is connected to the plurality of second internal electrodes 122 exposed to the sixth surface C2. The second mounting portion 162b extends from the second connection portion 162a to the first surface M1 and the second surface M2 of the body 110. The second side portion 162c extends from the second connection portion 162a to the third surface F1 and the fourth surface F2 of the body 110. In other words, the second mounting portion 162b may be parallel to a plane formed by the second internal electrode 122, and the second side portion 162c may be perpendicular to the plane formed by the second internal electrode 122.

The second mounting portion 162b disposed on the first surface M1 of the body 110 and the second mounting portion 162b disposed on the second surface M2 of the body 110 may be symmetrical to each other in the third direction T based on the body 110. The second side portion 162c disposed on the third surface F1 of the body 110 and the second side portion 162c disposed on the fourth surface F2 of the body 110 are symmetrical to each other in the second direction W based on the body 110.

As described above, the first mounting portion 161b/the second mounting portion 162b formed on the first surface M1 of the body 110, and the first mounting portion 161b/the second mounting portion 162b formed on the second surface M2 of the body 110 are symmetrical to each other, and the thickness TL of the lower cover layer 113 and the thickness TH of the upper cover layer 112 may be formed to be equal. Accordingly, when mounting the electronic component 100 on a substrate, mounting directionality may be eliminated. That is, the electronic component 100 may be mounted such that the first surface M1 of the body 110 faces the substrate or the second surface M2 of the body 110 faces the substrate.

Meanwhile, the first connection portion 161a, the first mounting portion 161b, and the first side portion 161c of the first external electrode 161 are formed by the same process (or a single process), and thus, thicknesses of the first connection portion 161a, the first mounting portion 161b, and the first side portion 161c may be substantially equal. Here, the thicknesses of the first connection portion 161a, the first mounting portion 161b, and the first side portion 161c refer to average thicknesses. Here, the expression "the thickness is equal" is interpreted to mean not only a case in which the thickness is completely the same, but also a case in which there is a slight difference in thickness that may occur due to a process error.

The first connection portion 161a and the first side portion 161c are integrally connected. That is, the first connection portion 161a and the first side portion 161c may be directly connected without a separate medium. Similarly, the first connection portion 161a and the first mounting portion 161b are integrally connected, and the first side portion 161c and the first mounting portion 161b are also integrally connected. Alternatively, at least two of the first connection portion 161a, the first mounting portion 161b, and the first side portion 161c are in direct contact with each other directly contact each other.

Similarly, thicknesses of the second connection portion 162a, the second mounting portion 162b, and the second side portion 162c of the second external electrode 162 may be substantially equal. In addition, at least two of the second connection portion 162a, the second mounting portion 162b, and the second side portion 162c may be integrally connected. Alternatively, at least two of the second connection portion 162a, the second mounting portion 162b, and the second side portion 162c are in direct contact with each other.

Meanwhile, one side of the body 110 is disposed in a first internal space IS1, and the other side of the body 110 is disposed in a second internal space IS2.

The first external electrode 161 defines the first internal space IS1. The first internal space IS1 is determined by the first connection portion 161a and the first mounting portion 161b and the first side portion 161c bent from the first connection portion 161a. A space surrounded by the first connection portion 161a, the first mounting portion 161b, and the first side portion 161c is the first internal space IS1. Specifically, the first connection portion 161a has a rectangular shape, and the first mounting portion 161b and the first side portion 161c may be bent vertically from each side of the rectangular-shaped first connection portion 161a and extend to the second external electrode 162.

The second external electrode 162 defines the second internal space IS2. The second internal space IS2 is determined by the second connection portion 162a and the second mounting portion 162b and the second side portion 162c bent from the second connection portion 162a. A space surrounded by the second connection portion 162a, the second mounting portion 162b, and the second side portion 162c is the second internal space IS2. Specifically, the second connection portion 162a has a rectangular shape, and the second mounting portion 162b and the second side portion 162c may be bent vertically from each side of the rectangular-shaped second connection portion 162a and extend to the first external electrode 161.

In addition, the first external electrode 161 and the second external electrode 162 may be symmetrical based on a central portion of the body 110.

For example, the first mounting portion 161b of the first external electrode 161 disposed on the first surface M1 of the body 110 and the second mounting portion 162b of the second external electrode 162 disposed on the first surface M1 of the body 110 are symmetrical in the first direction L based on the body 110. In addition, the first side portion 161c of the first external electrode 161 disposed on the third surface F1 of the body 110 and the second side portion 162c of the second external electrode 162 disposed on the third surface F1 of the body 110 are symmetrical based on the body 110. In addition, the first connection portion 161a of the first external electrode 161 disposed on the fifth surface C1 of the body 110 and the second connection portion 162a of the second external electrode 162 disposed on the sixth surface C2 of the body 110 are symmetrical in the first direction L based on the body 110.

Here, referring to FIG. 4, the first external electrode 161 may include a first electrode layer 131 and a first plating layer 151 which are sequentially stacked.

The first electrode layer 131 may include a conductive metal, for example, at least one of copper (Cu), nickel, gold, silver, platinum, and palladium, or alloys thereof, but is not limited thereto. In addition, the first electrode layer 131 may include glass as an auxiliary material. The conductive metal ensures chip sealing and electrical connectivity with a chip, and glass fills an empty space when the metal is sintered and contracted, and at the same time, imparts a bonding force between the first external electrode 161 and the body 110.

The first plating layer 151 may be a stacked nickel (Ni)/tin (Sn) plating layer or a stacked nickel (Ni)/gold (Au) plating layer, but is not limited thereto. The first plating layer 151 improves contact with solder when mounted on a substrate.

The second external electrode 162 may also include a second electrode layer 132 and a second plating layer 152 which are sequentially stacked. The second electrode layer 132 may be formed of substantially the same material and structure as the first electrode layer 131, and the second plating layer 152 may be formed of substantially the same material and structure as the first plating layer 151.

Hereinafter, a structure/shape of the second internal electrode 122 will be described in detail with reference to FIGS. 5 to 8. Although not described separately, a structure/shape of the first internal electrode 121 are also substantially the same as the structure/shape of the second internal electrode 122.

Figure 5:
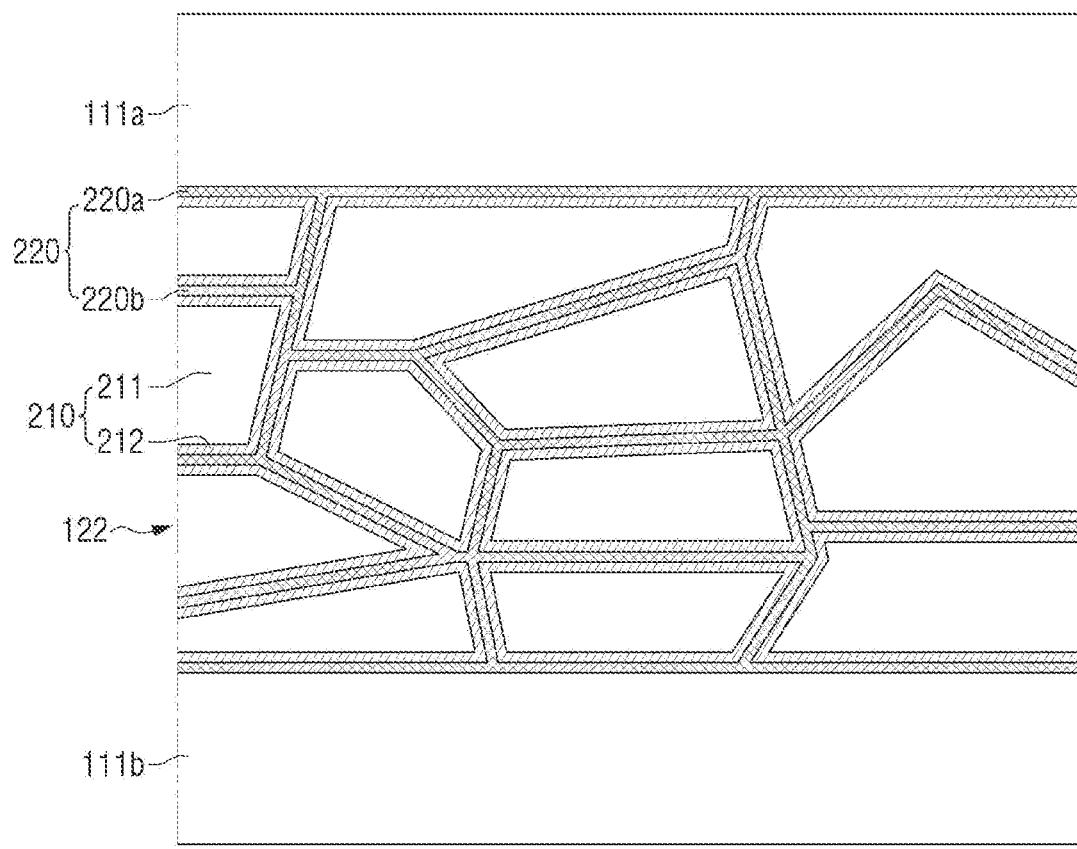
FIG. 5 is an enlarged cross-sectional view specifically illustrating a region Q1 of FIG. 4.
Figure 6:
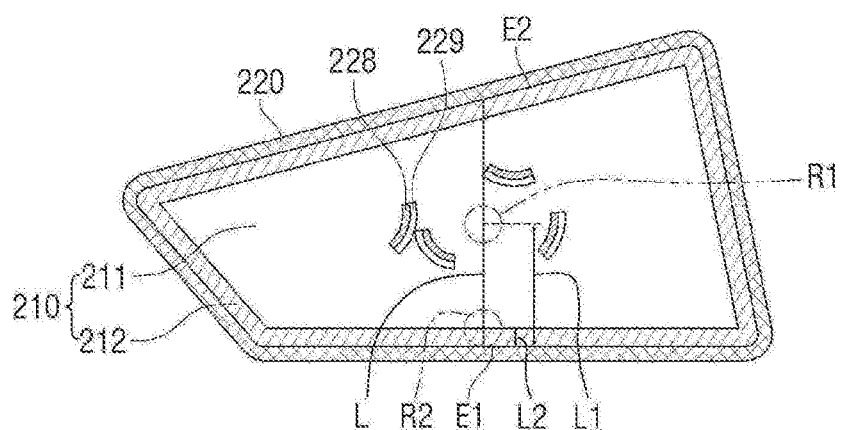
FIG. 6 is a cross-sectional view specifically illustrating a particle and a graphene layer shown in FIG. 5.
Figure 7:
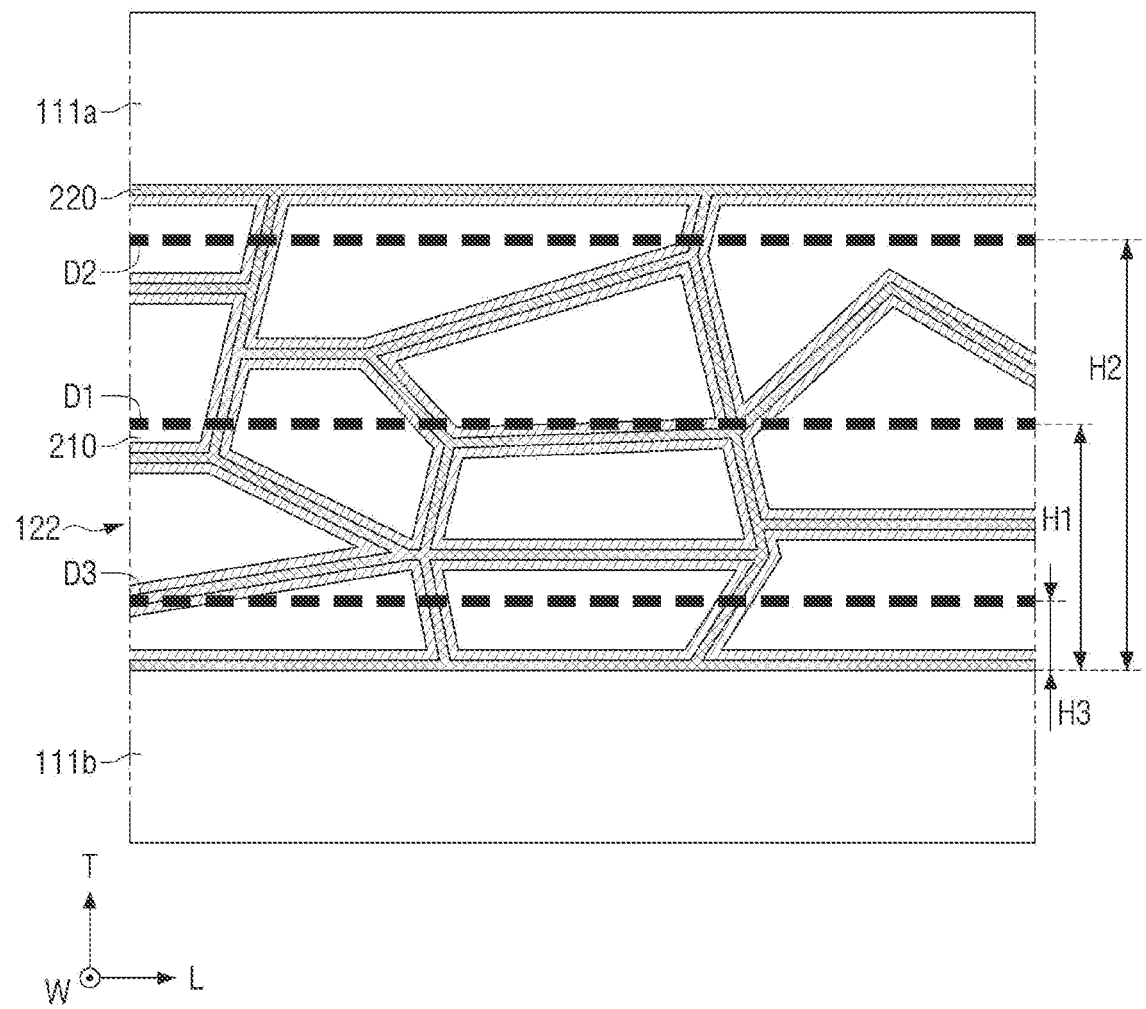
FIG. 7 is a cross-sectional view illustrating features in the region Q1 of FIG. 4.

FIG. 5 is an enlarged cross-sectional view specifically illustrating a region Q1 of FIG. 4. FIG. 6 is a cross-sectional view specifically illustrating a particle and a graphene layer shown in FIG. 5. FIG. 7 is a cross-sectional view illustrating features in the region Q1 of FIG. 4.

First, referring to FIGS. 5 and 6, the second internal electrode 122 is disposed between corresponding dielectric layers 111a and 111b. The second internal electrode 122 includes a plurality of particle 210 and a graphene layer 220 formed at boundaries E1 and E2 of the particle 210.

Specifically, the particle 210 includes Ni and Sn. Ni is a main component of the second internal electrode 122, and Sn may improve reliability (i.e., high temperature load life) of the second internal electrode 122.

The particle 210 includes a core region 211 and an edge region 212. The core region 211 may mainly include Ni, and the edge region 212 may mainly include a Ni—Sn alloy.

An Sn content (i.e., the number of atoms) in the core region 211 and an Sn content (i.e., the number of atoms) in the edge region 212 may be different from each other. That is, the Sn content of the core region 211 may be smaller than the Sn content of the edge region 212. Sn has characteristics of diffusing at high temperatures, but Sn is blocked by the graphene layer 220 formed at the boundaries E1 and E2 of the particle 210, so that Sn cannot diffuse out of the particle 210 and may be trapped in the particle 210. Accordingly, the Sn content in the edge region 212 adjacent to the boundaries E1 and E2 between the particle 210 and the graphene layer 220 is increased.

Specifically, it is assumed that a ratio of the Sn content to a total content of Ni and Sn (i.e., the ratio of the number of atoms) is Sn/(Ni+Sn). Sn/(Ni+Sn) in a first region R1 located inside the particle 210 at a first distance L1 from the boundary (e.g., E1) between the particle 210 and the graphene layer 220 is A1 and Sn/(Ni+Sn) in a second region R2 located inside the particle 210 at a second distance L2 from the boundary (e.g., E1) is A2. Here, when the second distance L2 is smaller than the first distance L1, A1 is smaller than A2. The "distance" of the first distance L1 and the second distance L2 refers to the shortest distance from the nearest boundary in each of the regions R1 and R2.

As illustrated, the first region R1 may not include the edge region 212 and the second region R2 may be selected to include at least a portion of the edge region 212.

Alternatively, the first region R1 may be selected to include the center of gravity of the particle 210 or close to the center of gravity, and the second region R2 may be selected to be spaced apart from the first region R1 and close to the boundary (e.g., E1) between the particle 210 and the graphene layer 220.

Alternatively, assuming a segment L connecting the first boundary E1 and the second boundary E2 facing each other, the first region R1 and the second region R2 do not overlap each other, and the first region R1 and the second region R2 are selected on the segment L. "Selecting the first region R1 and the second region R2 on the segment L" means that the first region R1 and the second region R2 are selected to include a portion of the segment L.

In addition, the second region R2 has to be selected closer to the first boundary E1 than the first region R1. That is, when the distance from the first boundary E1 to the first region R1 is the first distance L1, the distance from the first boundary E1 to the second region R2 is the second distance L2, and a length of the segment L is La, L2<L1≤La/2 is satisfied.

For example, the first region R1 and the second region R2 are selected from each of at least five particles 210. A quantitative analysis may be performed on Ni and Sn in the selected five first regions R1 to obtain five Sn/(Ni+Sn), and A1 may be calculated by obtaining an average value of the five Sn/(Ni+Sn). In addition, a quantitative analysis may be performed on Ni and Sn in the selected five second regions R2 to obtain five Sn/(Ni+Sn), and A2 may be calculated by obtaining an average value of the five Sn/(Ni+Sn).

In the drawings, for convenience of description, the core region 211 and the edge region 212 of the particle 210 are illustrated to be clearly distinguished from each other, but the boundary between the core region 211 and the edge region 212 may not be apparent. For example, in the vicinity of the boundary between the core region 211 and the edge region 212, the content of Sn may gradually increase in a direction toward the graphene layer 220.

Meanwhile, as shown in FIG. 5, a graphene layer 220b may be disposed between the particles 210 adjacent to each other, and the adjacent particles 210 may be separated/distinguished from each other by the graphene layer 220b.

The graphene layer 220a installed on outer surfaces of the second internal electrode 122 facing the dielectric layers 111a and 111b may improve connectivity of the second internal electrode 122 to help to secure target capacitance. The graphene layer 220a helps to improve smoothness of the second internal electrode 122. The graphene layer 220 allows Sn to be trapped in the particle 210 so that Sn does not diffuse into the dielectric layers 111a and 111b. Accordingly, the graphene layer 220 may prevent a decrease in capacitance caused by diffusion of Sn into the dielectric layers 111a and 111b.

Referring to FIG. 7, Sn/(Ni+Sn) at a point H1 of 5/10 of a thickness of the second internal electrode 122 is referred to as A3, and Sn/(Ni+Sn) at a point H2 of 9/10 of the thickness of the second internal electrode 122 or at a point H3 of 1/10 of the thickness of the second internal electrode 122 is A4. In addition, a function ABS(x) is a function that calculates an absolute value of x. Here, 0≤ABS(A4−A3)/A4≤10% is satisfied.

For example, five portions which are spaced apart from each other are selected from a plane D1 at a point H1 of 5/10 of a thickness of the second internal electrode 122 are selected, a quantitative analysis is performed on Ni and Sn of the selected five portions to calculate five Sn/(Ni+Sn), and A3 is calculated by obtaining an average value of the five Sn/(Ni+Sn). Similarly, five portions which are spaced apart from each other are selected from a plane D2 or D3 at a point H2 of 9/10 or at a point of H3 of 1/10 of the thickness of the second internal electrode 122 are selected, a quantitative analysis is performed on Ni and Sn of the selected five portions to calculate five Sn/(Ni+Sn), and A4 is calculated by obtaining an average value of the five Sn/(Ni+Sn). The five portions selected from the plane D1 and the five portions selected from the plane D2 or D3 may overlap each other in the third direction T (or in the thickness direction of the body 110).

As described above, Sn improves reliability (i.e., high temperature load life) of the second internal electrode 122, but diffusion of Sn into the dielectric layers 111a and 111b lower a dielectric constant of the dielectric layers 111a and 111b to reduce capacitance. In some exemplary embodiments in the present disclosure, diffusion of Sn into the dielectric layers 111a and 111b may be controlled using the graphene layer 220. In particular, when ABS(A4−A3)/A4≤10% is satisfied, movement (or diffusion) of Sn used as an additive in the second internal electrode 122 may be suppressed within a sufficiently controllable range, and accordingly, a significant decrease in the dielectric constant of the dielectric layer 111 may be prevented. ABS(A4−A3)/A4=0 indicates that A3 and A4 are the same. That is, Sn/(Ni+Sn) at the point H1 of 5/10 of the thickness of the second internal electrode 122 and Sn/(Ni+Sn) at a point (H2 or H3) of 1/10 or 9/10 of the thickness of the second internal electrode 122 are the same. That is, it may mean that the movement (or diffusion) of Sn used in the second internal electrode 122 is substantially suppressed.

Referring back to FIG. 6, a graphene piece 229 may be located inside the particle 210. Although it will be described later with reference to FIG. 17, the particle 210 shown in FIG. 6 may be formed as a plurality of conductive powder particles 11 for internal electrodes agglomerate by sintering. The conductive powder particle 11 may include metal powder particle containing Ni, a coating layer formed on a surface of the metal powder particle and containing Sn, and graphene formed on a surface of the coating layer. During the agglomeration process, graphene located on the surface of the conductive powder particle 11 may remain in the particle 210.

In addition, a Ni—Sn alloy 228 in direct contact with the graphene piece 229 may be located inside the particle 210. Since a portion of the coating layer Sn of the conductive powder particle 11 reacts with Ni to form an Ni—Sn alloy, the Ni—Sn alloy 228 may remain to be in direct contact with the graphene piece 229.

Figure 8:
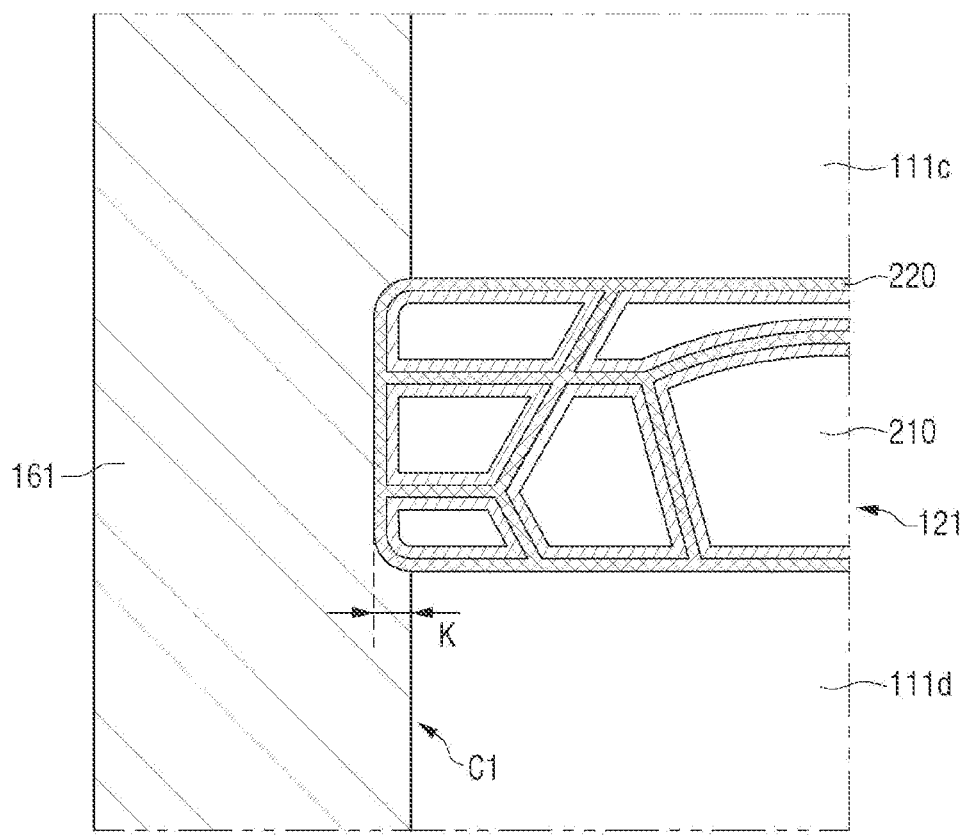
FIG. 8 is an enlarged cross-sectional view specifically illustrating a region Q2 of FIG. 6.

FIG. 8 is an enlarged cross-sectional view specifically illustrating the region Q2 of FIG. 6.

Referring to FIG. 8, the first internal electrode 121 is in contact with the first external electrode 161 (i.e., the first electrode layer 131) through the fifth surface C1 of the body 110. In particular, the graphene layer 220 is formed on an upper surface (e.g., a surface in contact with the dielectric layer 111c), a lower surface (e.g., a surface in contact with the dielectric layer 111d), and a side surface of the first internal electrode 121.

Due to this configuration, radial cracks at the contact portions of the first internal electrode 121 and the first external electrode 161 may be reduced. This is because Ni of the first internal electrode 121 is not exposed to the outside, and thus formation of NiO may be reduced. Since NiO has a larger volume than Ni, radial cracks easily occur. Thus, radial cracks may be reduced by preventing the formation of NiO.

In addition, it is because Cu constituting the first external electrode 161 is prevented from diffusing into the first internal electrode 121.

In addition, the graphene layer 220 of the first internal electrode 121 on the fifth surface C1 of the body 110 protrudes from the dielectric layer 111c or 111d (see reference numeral K) so as to be in contact with the external electrode 161.

A manufacturing process of an electronic component includes a polishing process. The polishing process is a process of rounding a sharp outer surface of the body 110 so that the body 110 may be properly connected with the external electrodes 161 and 162. Since strength of the graphene layer 220 is stronger than that of the dielectric layers 111c or 111d, the graphene layer 220 may be polished less than the dielectric layers 111c or 111d in the polishing process. Accordingly, the graphene layer 220 may protrude from the dielectric layer 111c or 111d.

Since the graphene layer 220 protrudes, a contact area between the first internal electrode 121 and the first external electrode 161 is increased. Accordingly, contact resistance between the first internal electrode 121 and the first external electrode 161 may be reduced.

Figure 9:
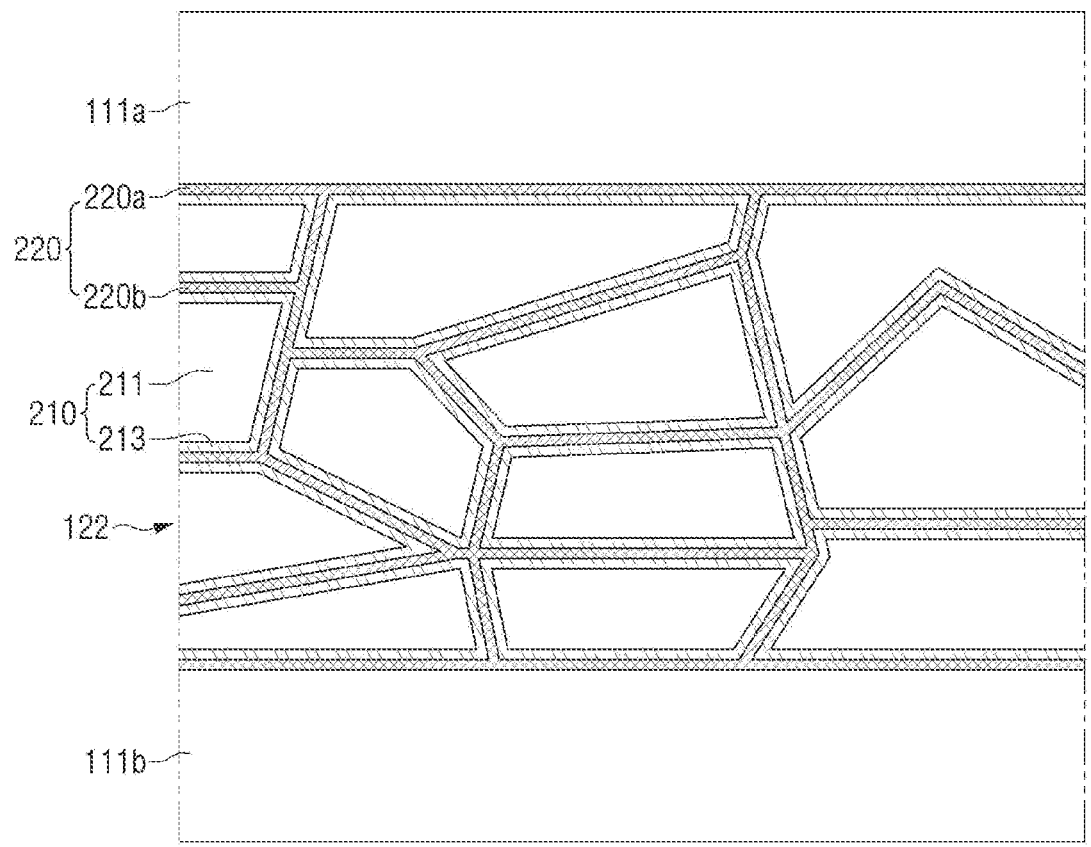
FIG. 9 is a cross-sectional view for explaining an electronic component according to another exemplary embodiment in the present disclosure.
Figure 10:
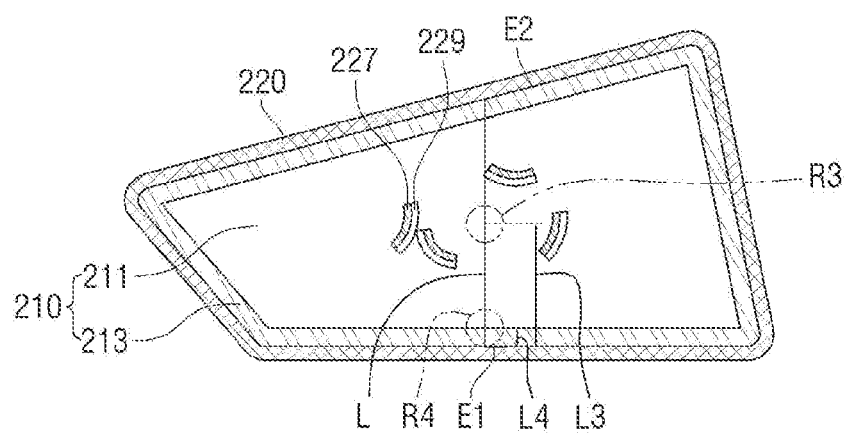
FIG. 10 is a cross-sectional view specifically illustrating a particle and a graphene layer shown in FIG. 9.

FIG. 9 is a cross-sectional view for explaining an electronic component according to another exemplary embodiment in the present disclosure. FIG. 10 is a cross-sectional view specifically illustrating a particle and a graphene layer shown in FIG. 9. For convenience of explanation, differences from those described with reference to FIGS. 1 to 8 will be mainly described.

Referring to FIGS. 9 and 10, the second internal electrode 122 is disposed between the corresponding dielectric layers 111a and 111b. The second internal electrode 122 includes a plurality of particle 210 and a graphene layer 220 formed at the boundaries E1 and E2 of the particle 210.

Specifically, the particle 210 further includes at least one material X selected from the group consisting of Li, Na, and K, as well as Ni and Sn. The material X may prevent the formation of NiO on the second internal electrode 122 and may form an oxide including Ni and X. Since NiO has insulating properties, it may increase resistance of the second internal electrode 122 and cause a capacitance reduction phenomenon. In contrast, since an oxide containing Ni and X (e.g., $Li_xNi_{1-x}O$) has conductivity, oxide may prevent a decrease in capacitance of the second internal electrode 122.

Since Li, Na, and K have common characteristics to be described below, they will be described below using Li.

The particle 210 includes a core region 211 and an edge region 212. The core region 211 may mainly include Ni, and the edge region 212 may mainly include $Li_xNi_{1-x}O$, an Ni—Sn alloy, or the like.

The Sn content (i.e., the number of atoms) in the core region 211 and the Sn content (i.e., the number of atoms) in the edge region 212 may be different from each other. Sn has characteristics of diffusing at high temperatures, but Sn is blocked by the graphene layer 220 formed at the boundaries E1 and E2 of the particle 210, so that Sn cannot diffuse out of the particle 210 and may be trapped in the particle 210.

It is assumed that a ratio of the Sn content (i.e., a ratio of the number of atoms) to a total content of Ni, Sn, and X is Sn/(Ni+Sn+X). Sn/(Ni+Sn+X) in a third region R3 located at a third distance L3 from the boundary (e.g., E1) between the particle 210 and the graphene layer 220 is referred to as B1, and Sn/(Ni+Sn+X) in a fourth region R4 located at a fourth distance L4 from the boundary (e.g., E1) is referred to as B2. Here, when the fourth distance L4 is smaller than the third distance L3, B1 is smaller than B2.

Assuming a segment L connecting the first boundary E1 and the second boundary E2 facing each other, the third region R3 and the fourth region R4 do not overlap each other, and the third region R3 and the fourth region R4 are selected on the segment L. When a distance from the first boundary E1 to the third region R3 is a third distance L3, a distance from the first boundary E1 to the fourth region R4 is a fourth distance L4, and a length of the segment L is La, L4<L3<La/2 is satisfied.

For example, the third region R3 and the fourth region R4 are selected from each of at least five particles 210. A quantitative analysis may be performed on Ni, Sn and X in the selected five third regions R3 to obtain five Sn/(Ni+Sn+X), and B1 may be calculated by obtaining an average value of the five Sn/(Ni+Sn+X). In addition, a quantitative analysis is performed on Ni and Sn is performed in the selected five fourth regions R4 to obtain five Sn/(Ni+Sn+X), and B2 may be calculated by obtaining an average value of the five Sn/(Ni+Sn+X).

In addition, (similar to the case described above with reference to FIG. 7), when Sn/(Ni+Sn+X) at a point of 5/10 of the thickness of the second internal electrode 122 is referred to as B3, Sn/(Ni+Sn+X) at a point of 9/10 or 1/10 of the thickness of the second internal electrode is B4, and ABS is a function that calculates an absolute value, ABS(B4−B3)/B4≤10% is satisfied.

In addition, in FIG. 10, a graphene piece 229 may be located inside the particle 210. Although it will be described later, the particle 210 shown in FIG. 10 may be formed as a plurality of conductive powder particles for internal electrodes (12 of FIG. 12 or 13 of FIG. 13) agglomerate by sintering. The conductive powder particle 12 or 13 may include a metal powder particle including Ni, a first coating layer formed on a surface of the metal powder particle and including at least one material X selected from the group consisting of Li, Na, and K, a second coating layer formed on the surface of the metal powder particle and including Sn, and graphene formed on a surface of the first coating layer or the second coating layer. During the agglomeration process, graphene located on the surface of the conductive powder particle 12 or 13 may remain in the particle 210.

In addition, a layer 227 including $Li_xNi_{1-x}O$ and a Ni—Sn alloy in direct contact with the graphene piece 229 may be located inside the particle 210. During the agglomeration process, a portion of the coating layer (Sn) of the conductive powder particle 12 or 13 reacts with Ni to form a Ni—Sn alloy, and Li and Ni react and are oxidized to form $Li_xNi_{1-x}O$, so that the layer 227 may remain to be in direct contact with the graphene piece 229.

Figure 11:
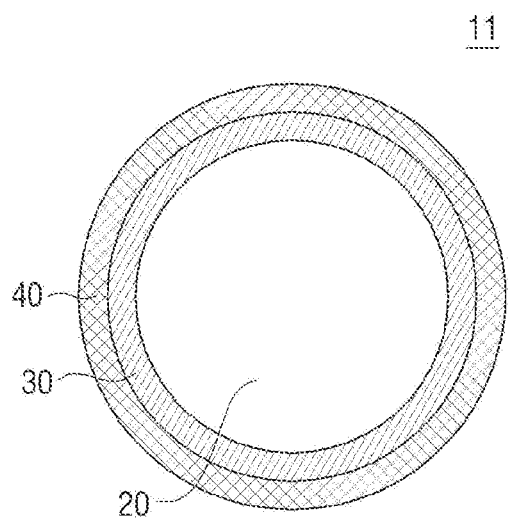
FIGS. 11 to 13 are cross-sectional views illustrating a conductive powder particle for internal electrodes according to some exemplary embodiments in the present disclosure.
Figure 12:
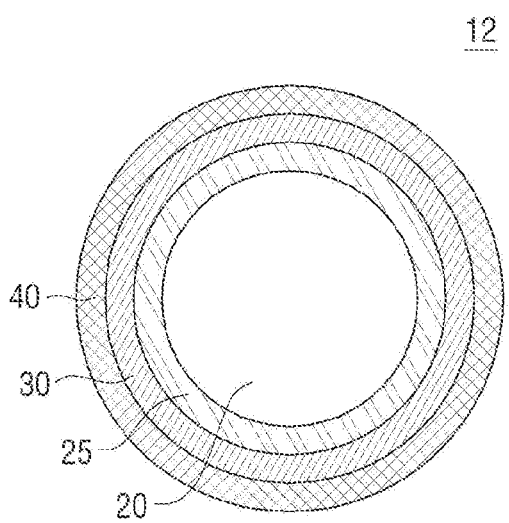
Figure 13:
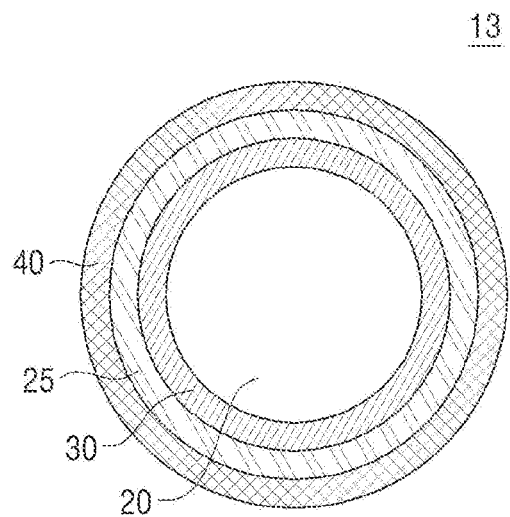

Hereinafter, a conductive powder particle for forming internal electrodes will be described with reference to FIGS. 11 through 13. FIGS. 11 through 13 are cross-sectional views illustrating a conductive powder particle for internal electrodes according to some exemplary embodiments in the present disclosure.

Referring to FIG. 11, the conductive powder particle 11 for internal electrodes according to an exemplary embodiment in the present disclosure may include a metal powder particle 20 including Ni, a coating layer 30 formed on a surface of the metal powder 20 and including Sn, and graphene 40 formed on a surface of the coating layer 30.

Referring to FIG. 12, the conductive powder particle 12 for internal electrodes according to another exemplary embodiment in the present disclosure may include a metal powder particle 20 including Ni, a second coating layer 25 including at least one material X selected from the group consisting of Li, Na, and K, a first coating layer 30 formed on a surface of the second coating layer 25 and including Sn, and graphene 40 formed on a surface of the first coating layer 30.

Li, Na, and K increase conductivity of the internal electrodes 121 and 122 by reducing the formation of nickel oxide (NiO). The second coating layer 25 may include, for example, at least one selected from the group consisting of lithium carbonate ($Li_2CO_3$), sodium carbonate ($Na_2CO_3$), and potassium carbonate ($K_2CO_3$). For example, lithium carbonate ($Li_2CO_3$) may be 0.1 mol % to 20 mol % compared to the metal powder particle (Ni). Graphene 40 may be 0.1 wt % to 1 wt % compared to the metal powder particle (Ni).

Li, which is volatile, may diffuse into the dielectric layer 111. Li acts as a low-temperature sintering agent in the dielectric layer, which causes composition unevenness (particle growth). The conductive powder particle 12 according to another exemplary embodiment in the present disclosure allows Li to be coated to be close to (or in contact with) the metal powder particle (Ni), so that Li and Ni may quickly react with each other, thereby reducing diffusion of Li and generating $Li_xNi_{1-x}O$. $Li_xNi_{1-x}O$, which has conductivity, may prevent a reduction of capacitance of the internal electrodes 121 and 122.

Referring to FIG. 13, the conductive powder particle 13 for internal electrodes according to another exemplary embodiment in the present disclosure may include a metal powder particle 20 including Ni, a first coating layer 30 formed on a surface of the metal powder particle 20 and including Sn, a second coating layer 25 formed on a surface of the first coating layer 30 and including at least one material X selected from the group consisting of Li, Na, and K, and graphene 40 formed on a surface of the second coating layer 25.

In addition, although not shown separately, a conductive powder particle including a metal powder particle, a coating layer formed on a surface of the metal powder particle and including a material X, and graphene formed on a surface of the coating layer may also be used.

Figure 14:
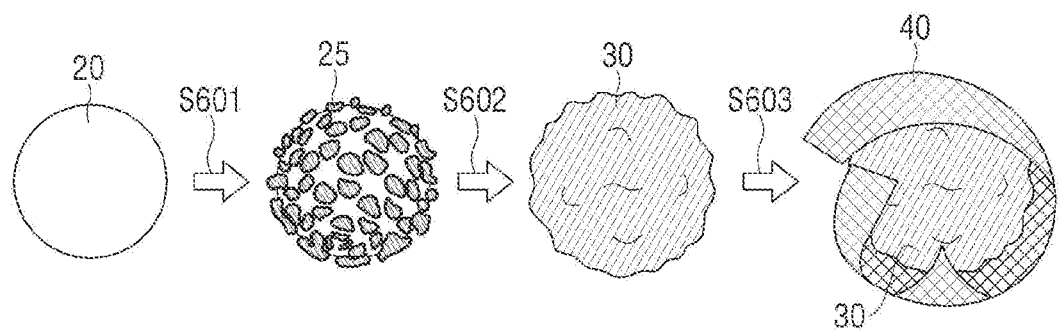
FIG. 14 is a view illustrating a method of manufacturing the conductive powder particle for internal electrodes shown in FIG. 12.
Figure 15:
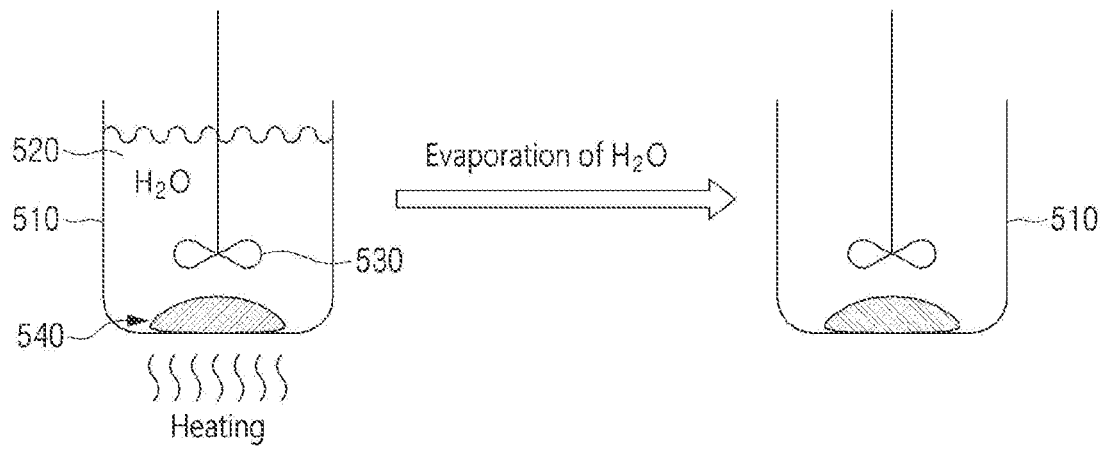
FIG. 15 is a conceptual view illustrating operation S601 of FIG. 14.

FIG. 14 is a diagram illustrating a method of manufacturing a conductive powder particle for internal electrodes shown in FIG. 12. FIG. 15 is a conceptual diagram illustrating operation S601 of FIG. 14.

First, referring to FIG. 14, the second coating layer 25 including at least one material X selected from the group consisting of Li, Na, and K is formed on the surface of the metal powder particle 20 including Ni (S601).

For example, a method of coating $Li_2CO_3$ on the surface of the metal powder particle 20 includes a precipitation method, an ALD method, a barrel sputtering method, a liquid coating method, and the like, but is not limited thereto.

Here, a $Li_2CO_3$ (or $Na_2CO_3$) coating method using a precipitation method will be described with reference to FIG. 15. A beaker 510 is filled with de-ionized water (DIW) 520, and Ni powder particles and $Li_2CO_3$ (or $Na_2CO_3$) are placed on the bottom of the beaker 510 (refer to 540). For example, DIW may be 400 g, Ni powder particles may be 24 g, and $Li_2CO_3$ may be 1.6 g. Subsequently, a stirrer 530 is rotated at a preset speed so that the Ni powder particle does not precipitate. In addition, the stirrer 530 is rotated and heated (e.g., 70° C. to 90° C.) so that the DIW 520 is gradually evaporated. After completely removing the DIW 520, powder particles remaining on the bottom of the beaker 510 are recovered.

Referring back to FIG. 14, the first coating layer 30 including Sn is formed on the surface of the second coating layer 25 (S602). A method of forming the first coating layer 30 may be, for example, an atomic layer deposition (ALD) method using a Sn source or a mixing method using Sn powder particles, but is not limited thereto.

Subsequently, the graphene 40 is formed on the surface of the first coating layer 30 (S603). For example, the graphene 40 and the first coating layer 30 may be pi-bonded by a chemical method, or the graphene 40 and the first coating layer 30 may be combined with each other based on van der Waals force by a physical method.

Figure 16:
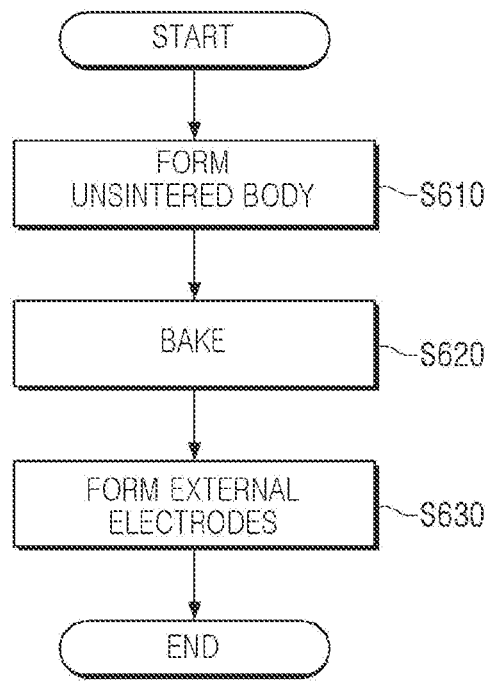
FIG. 16 is a flowchart illustrating a method of manufacturing an electronic component according to some exemplary embodiments in the present disclosure.
Figure 17:
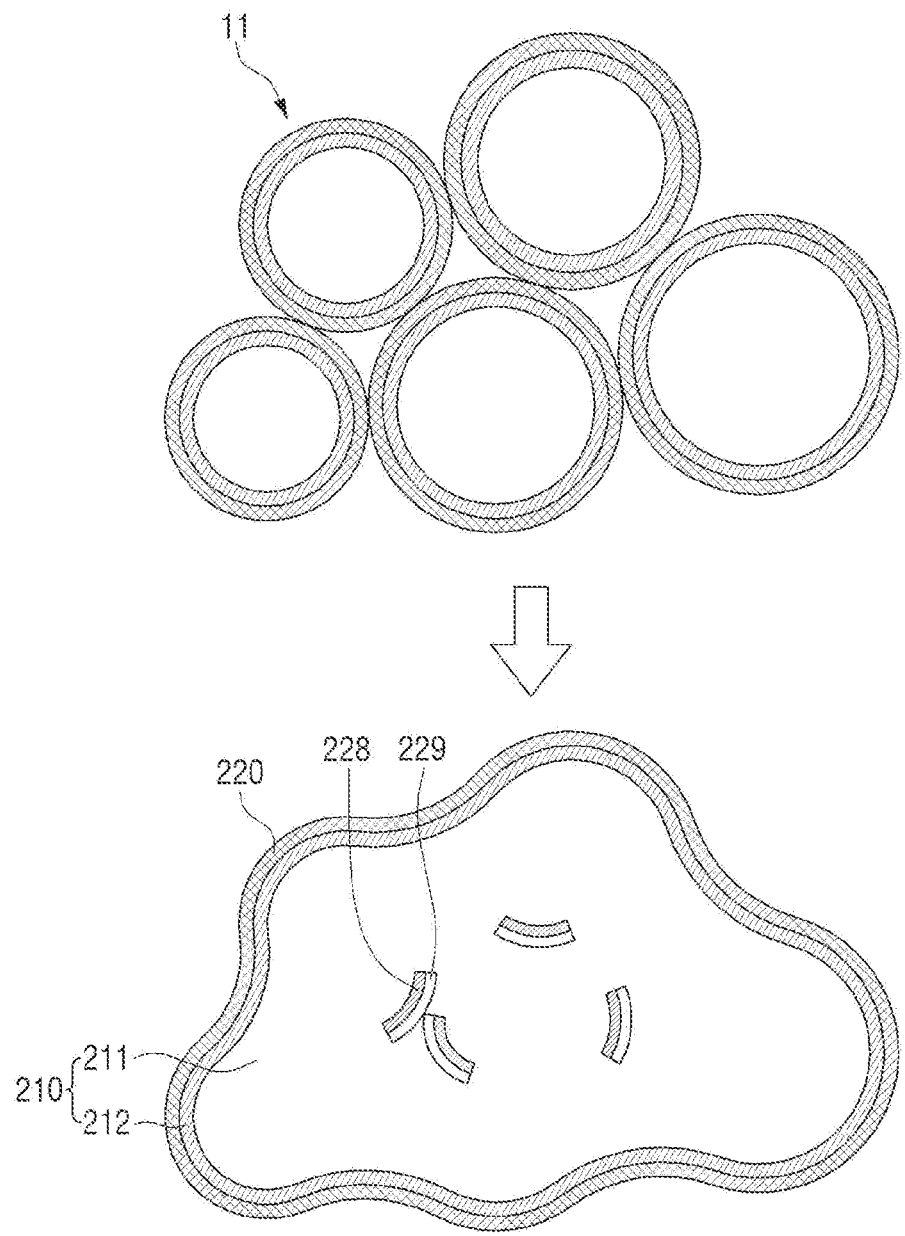
FIG. 17 is a view illustrating operation S620 of FIG. 16.

FIG. 16 is a flowchart illustrating a method of manufacturing an electronic component according to some exemplary embodiments in the present disclosure. FIG. 17 is a diagram illustrating operation S620 of FIG. 16.

Referring to FIG. 16, a body in an unsintered state is formed (S610).

Specifically, a plurality of ceramic green sheets are prepared, and a conductive paste is applied on each ceramic green sheet using a printing method such as a screen printing method or a gravure printing method.

Here, as the conductive paste, the conductive powder particles 11, 12, and 13 for internal electrodes described above with reference to FIGS. 11 through 13 may be used. For example, the conductive powder particle 11 of FIG. 11 is used to form the internal electrode of FIG. 5. In order to form the internal electrode of FIG. 9, the conductive powder particle 12 of FIG. 12 or the conductive powder particle 13 of FIG. 13 may be used.

Alternatively, different types of conductive powder particles may be mixed and used. For example, the conductive powder particle 11 of FIG. 11 coated with Sn and a conductive powder particle coated with a material X, not Sn, (i.e., a conductive powder particle including a coating layer formed on a surface of a metal powder particle and including the material X and graphene formed on a surface of the coating layer) may be used together.

Next, a plurality of ceramic green sheets are stacked and pressed in a stacking direction to compress the stacked ceramic green sheets and the conductive paste for internal electrodes to each other.

Subsequently, the compressed stack is cut for each region corresponding to a body of one multilayer capacitor, thereby completing a body in an unsintered state. The completed unsintered body includes a plurality of unsintered dielectric layers and unsintered internal electrodes formed of a conductive paste including Ni, Sn, and graphene layers on the unsintered dielectric layers.

Subsequently, the body in the unsintered state is heat-treated to burn the binder and sintered in a reducing atmosphere to obtain a sintered body 110 (S620).

Referring to FIG. 17, when sintering proceeds, a plurality of conductive powder particles 11 are agglomerated with each other. Specifically, in the conductive powder particle 11, graphene (e.g., 40 in FIG. 14) is formed by pie bonding or bonding by van der Waals force. The graphene 40 may be formed not to completely surround the surface of the conductive powder particle 11 and may not be formed on a portion of the surface. When sintering proceeds, Ni and Sn may move through some spaces in which the graphene 40 is not formed. Through the transferred Ni and Sn, the adjacent conductive powder particles 11 start to agglomerate with each other. As a result, a plurality of conductive powder particles 11 (five conductive powder particles 11 in FIG. 17) may form one particle 210.

As described above, the particle 210 may include the core region 211 mainly including Ni and the edge region 212 formed on a Ni—Sn alloy. In addition, the graphene piece 229 may be located inside the particle 210. During the agglomeration process, graphene (40 in FIG. 14) located on the surface of the conductive powder particle 11 may remain in the particle 210. Inside the particle 210, a Ni—Sn alloy 228 in direct contact with the graphene piece 229 may be positioned.

Referring back to FIG. 16, external electrodes are formed on both end surfaces of the body 110 (S630). The external electrodes may include an electrode layer formed using copper paste including glass and a Ni/Sn plating layer on the electrode layer.

As set forth above, the internal electrodes of an electronic component according to some exemplary embodiments in the present disclosure includes particles including Ni and Sn and a graphene layer formed at the boundary between the particles. The graphene layer helps to secure a target capacitance by improving connectivity of the internal electrodes. In addition, the graphene layer prevents Sn from being diffused into the dielectric layer by trapping Sn in the particles. Therefore, a decrease in capacitance due to diffusion of Sn into the dielectric layer may be prevented.

While example exemplary embodiments have been shown and described above, it will be apparent to those skilled in the art that modifications and variations could be made without departing from the scope of the present disclosure as defined by the appended claims.

What is claimed is:

1. An electronic component comprising:
a body including a plurality of stacked dielectric layers and internal electrodes disposed with a corresponding dielectric layer interposed therebetween; and
external electrodes disposed on the body and connected to the internal electrodes corresponding thereto,
wherein
one of the internal electrodes includes a particle including Ni and Sn and a graphene layer disposed at a boundary of the particle,
a ratio of an Sn content to a total content of Ni and Sn is Sn/(Ni+Sn), and
Sn/(Ni+Sn) of a first region located inside the particle at a first distance from a boundary between the particle and the graphene layer is A1, Sn/(Ni+Sn) of a second region located inside the particle at a second distance from the boundary between the particle and the graphene layer is A2, the second distance is smaller than the first distance, and A1 is smaller than A2.

2. The electronic component of claim 1, wherein
the boundary between the particle and the graphene layer includes a first boundary and a second boundary facing each other, and
the first region and the second region are selected from a segment connecting the first boundary and the second boundary, and the first region and the second region do not overlap each other.

3. The electronic component of claim 2, wherein
L2<L1≤La/2 in which L1 is a first distance from the first boundary to the first region, L2 is a second distance from the first boundary to the second region, and La is a length of the segment.

4. The electronic component of claim 1, wherein
the particle further includes at least one material X selected from the group consisting of Li, Na, and K, and
a ratio of an Si content to a total content of Ni, Sn, and X is Sn/(Ni+Sn+X), and
Sn/(Ni+Sn+X) of a third region located inside the particle at a third distance from the boundary between the particle and the graphene layer is B1, Sn/(Ni+Sn+X) of a fourth region located inside the particle at a fourth distance from the boundary between the particle and the graphene layer is B2, the fourth distance is smaller than the third distance, and B1 is smaller than B2.

5. The electronic component of claim 1, wherein the particle further includes a graphene piece located therein and spaced apart from the boundary of the particle.

6. The electronic component of claim 5, wherein the particle further includes an Ni—Sn alloy in direct contact with the graphene piece.

7. The electronic component of claim 5, wherein the particle further includes at least one material X selected from the group consisting of Li, Na, and K, and the particle further includes an oxide in direct contact with the graphene piece and including Ni and X.

8. The electronic component of claim 1, wherein the one of the internal electrodes is in contact with one of the external electrodes through one surface of the body, and the graphene layer of the one of the internal electrodes protrudes from the one surface of the body, relative to the plurality of dielectric layers, and contacts the one of the external electrodes.

9. The electronic component of claim 1, wherein 0≤ABS(A4−A3)/A4≤10% in which A3 is Sn/(Ni+Sn) at a point of 5/10 of a thickness of the one the internal electrodes, A4 is Sn/(Ni+Sn) at a point of 9/10 or 1/10 of the thickness of the one of the internal electrodes, and ABS is a function of calculating an absolute value.

10. An electronic component comprising:
a body including a plurality of stacked dielectric layers and internal electrodes disposed with a corresponding dielectric layer interposed therebetween; and
external electrodes disposed on the body and connected to the internal electrodes,
wherein
a ratio of an Sn content to a total content of Ni and Sn is Sn/(Ni+Sn), Sn/(Ni+Sn) at a point of 5/10 of a thickness of one of the internal electrodes is A3, Sn/(Ni+Sn) at a point of 9/10 or 1/10 of the thickness of the one of the internal electrodes is A4, ABS is a function of calculating an absolute value, and 0≤ABS(A4−A3)/A4≤10% is satisfied.

11. The electronic component of claim 10, wherein
the one of the internal electrodes includes a particle including Ni and Sn and a graphene layer disposed at a boundary of the particle.

12. The electronic component of claim 10, wherein
the particle further includes at least one material X selected from the group consisting of Li, Na, and K, and
a ratio of an Sn content to a total content of Ni, Sn, and X is Sn/(Ni+Sn+X), Sn/(Ni+Sn+X) at a point of 5/10 of the thickness of the one of the internal electrodes is B3, Sn/(Ni+Sn+X) at a point of 9/10 or 1/10 of the thickness of the one of the internal electrodes is B4, ABS is a function for calculating an absolute value, and 0≤ABS(B4−B3)/B4≤10% is satisfied.

13. A conductive powder particle for internal electrodes, the conductive powder particle comprising:
a metal powder particle;
a coating layer surrounding at least a portion of a surface of the metal powder particle and including Sn; and
graphene surrounding at least a portion of a surface of the coating layer.

14. The conductive powder particle of claim 13, wherein the coating layer further includes at least one selected from the group consisting of Li, Na, and K.

15. The conductive powder particle of claim 14, wherein the coating layer further includes an additional coating layer surrounding at least a portion of a surface of the metal powder particle between the metal powder particle and the coating layer and including at least one selected from the group consisting of lithium carbonate, sodium carbonate, and potassium carbonate.

16. The conductive powder particle of claim 14, wherein the coating layer further includes an additional coating layer surrounding at least a portion of a surface of the coating layer between the coating layer and the graphene and including at least one selected from the group consisting of lithium carbonate, sodium carbonate, and potassium carbonate.

17. A method for manufacturing an electronic component, the method comprising:
forming an unsintered body including a plurality of unsintered dielectric layers and unsintered internal electrodes formed by applying a conductive paste including Ni, Sn, and graphene to the unsintered dielectric layers; and
sintering the unsintered body to form a sintered body,
wherein the conductive paste includes conductive powder particles including a metal powder particle including Ni, a coating layer formed to surround at least a portion of a surface of the metal powder particle and including Sn, and graphene formed to surround at least a portion of a surface of the coating layer.

18. The method of claim 17, wherein the coating layer of the conductive powder particle further includes at least one selected from the group consisting of Li, Na, and K.

19. The method of claim 18, wherein the coating layer further includes an additional coating layer formed to surround at least a portion of a surface of the metal powder particle between the metal powder particle and the coating layer and including at least one selected from the group consisting of lithium carbonate, sodium carbonate, and potassium carbonate.

20. The method of claim 17, wherein the conductive paste further includes a second conductive powder particle including a second metal powder particle including Ni, a second coating layer formed on a surface of the second metal powder particle and including at least one selected from the group consisting of Li, Na, and K, and second graphene formed on a surface of the second coating layer.

* * * * *